United States Patent
Kaushal et al.

(10) Patent No.: US 12,321,192 B2
(45) Date of Patent: Jun. 3, 2025

(54) ON-TABLE AND OFF-TABLE DETECTION FOR ELECTRONIC DEVICES

(71) Applicant: ADVANCED MICRO DEVICES, INC., Santa Clara, CA (US)

(72) Inventors: Prashant Kaushal, Bangalore (IN); Subash Maniyath, Chennai (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 37 days.

(21) Appl. No.: 18/133,733

(22) Filed: Apr. 12, 2023

(65) Prior Publication Data
US 2024/0345619 A1 Oct. 17, 2024

(51) Int. Cl.
*G06F 1/10* (2006.01)
*G01P 15/08* (2006.01)
*G01P 15/18* (2013.01)
*G06F 3/0346* (2013.01)
*G06F 3/038* (2013.01)

(52) U.S. Cl.
CPC .............. *G06F 1/10* (2013.01); *G01P 15/08* (2013.01); *G01P 15/18* (2013.01); *G06F 3/0346* (2013.01); *G06F 3/038* (2013.01)

(58) Field of Classification Search
CPC .......... G06F 1/10; G06F 3/0346; G06F 3/038; G01P 15/08; G01P 15/18
See application file for complete search history.

(56) References Cited

U.S. PATENT DOCUMENTS 9,367,145 B2 * 6/2016 Sheynblat ............. G06F 1/1626
9,436,231 B2    9/2016 Bevilacqua et al.

* cited by examiner

*Primary Examiner* — Sardis F Azongha

(57) ABSTRACT

A portable electronic device includes a status detector and a processor. The status detector is configured to obtain acceleration data from a motion sensor of the portable electronic device. The status detector is further configured to determine, for each acceleration measurement in the acceleration data, whether the acceleration measurement satisfies an acceleration threshold. Responsive to the acceleration measurement satisfying the acceleration threshold, the status detector is configured to increment a first counter. Responsive to the acceleration measurement not satisfying the acceleration threshold, the status detector is configured to selectively increment or refrain from incrementing a second counter. The status detector is further configured to determine whether the portable electronic device is in an on-table or an off-table state based on whichever of the counters reaches a counter threshold. The processor is configured to configure one or more components of the portable electronic device based on the determined state.

20 Claims, 6 Drawing Sheets

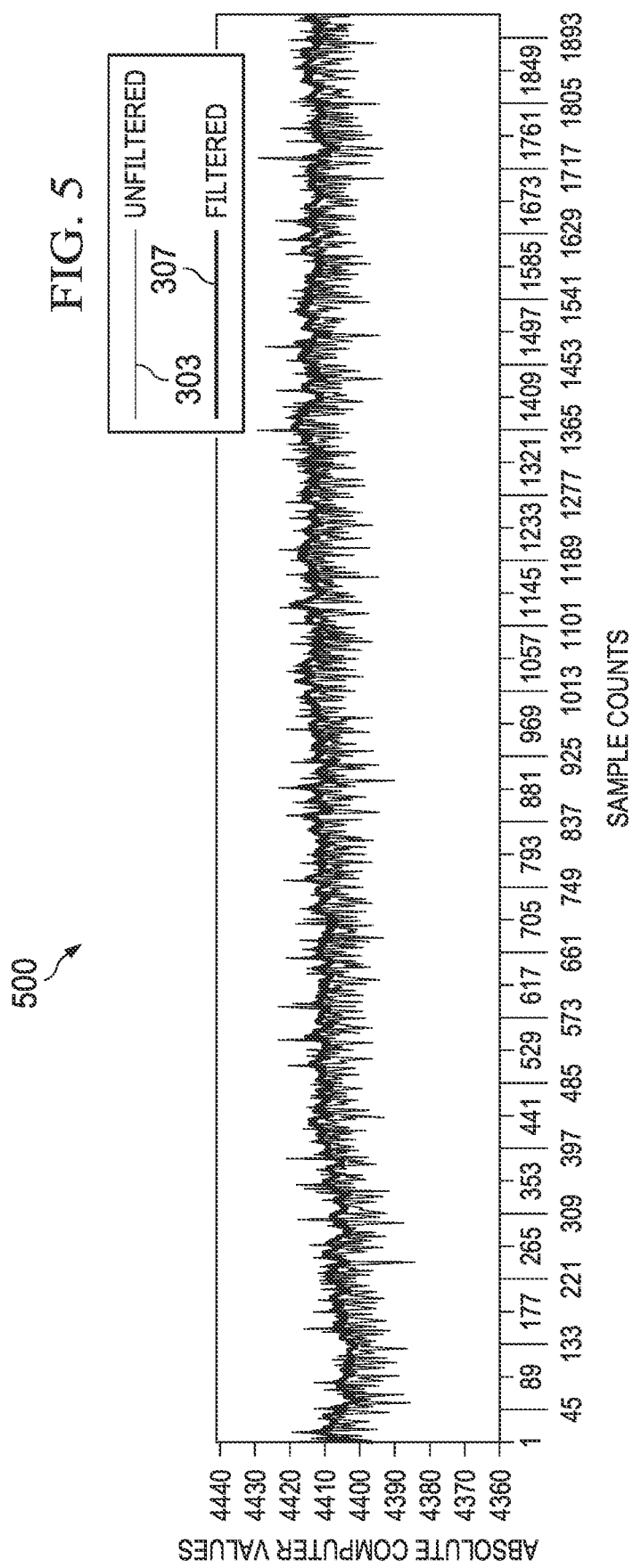

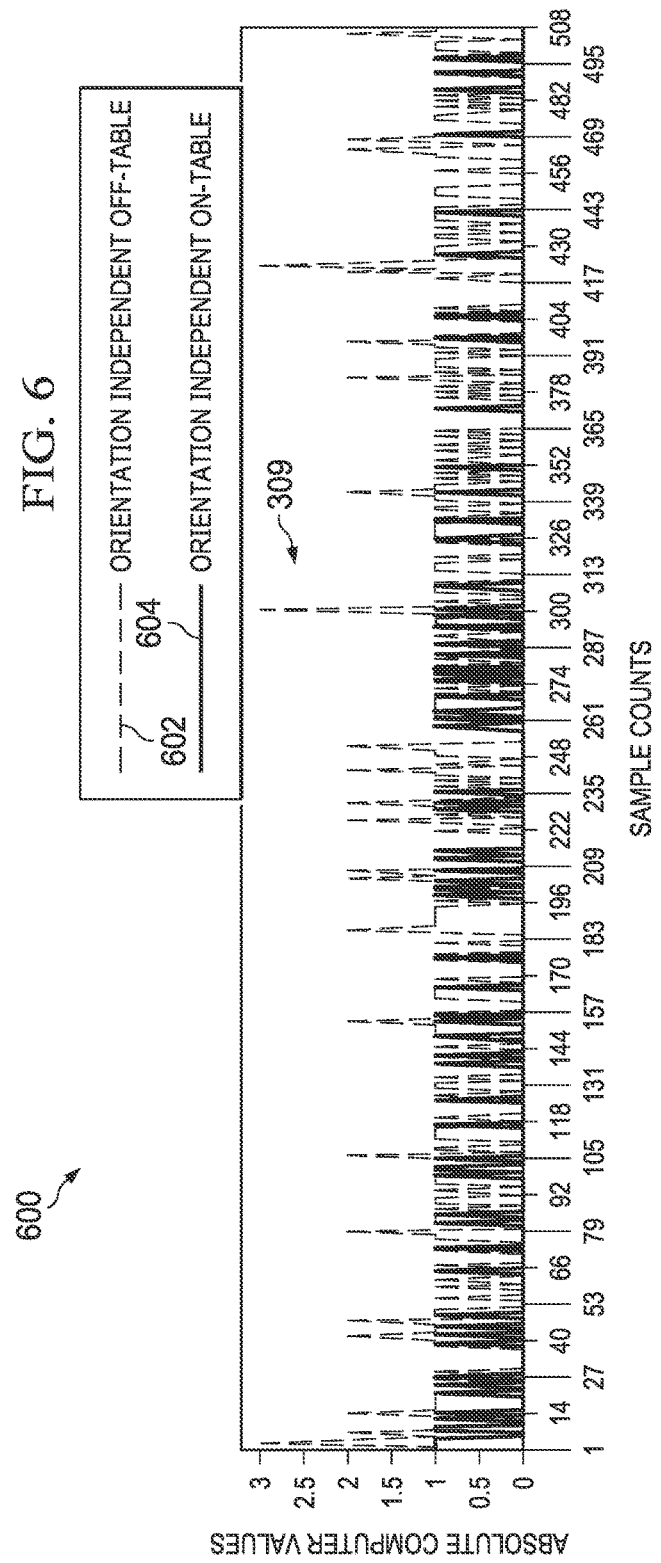

ON-TABLE AND OFF-TABLE DETECTION FOR ELECTRONIC DEVICES

BACKGROUND

Portable electronic devices, such as laptops, cellular phones, tablets, gaming devices, medical instruments, electrical tools, and the like, often implement different sensors that provide a variety of functions. One type of sensor is a motion sensor, which is a sensor that converts motion-based physical phenomena into analog or digital signals. For example, a motion sensor is capable of measuring various motion states, locations, orientations, and the like of a portable electronic based on detecting, for example, angular velocity, acceleration, vibrations, the direction of gravity or magnetic field, luminous intensity of ambient light, a combination thereof, or the like. Examples of motion sensors include accelerometers, gyroscopes, gravitometers, magnetometers, ambient light detectors, proximity sensors, and the like. The output of a motion sensor is typically used by software applications to sense or recognize one or more aspects of motion of the portable electronic device. For example, an application uses the output of the motion sensor to determine if the portable electronic device is stationary or in motion, determine the orientation of the portable electronic device, recognize gestures performed by a user, and use those gestures as inputs to perform one or more operations, as inputs to other applications, or the like.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 5 is a graph illustrating example raw acceleration data and example filtered accelerator data in accordance with some implementations.

FIG. 6 is a graph illustrating example orientation-independent acceleration data and example filtered accelerator data in accordance with some implementations.

DETAILED DESCRIPTION

Figure 1:
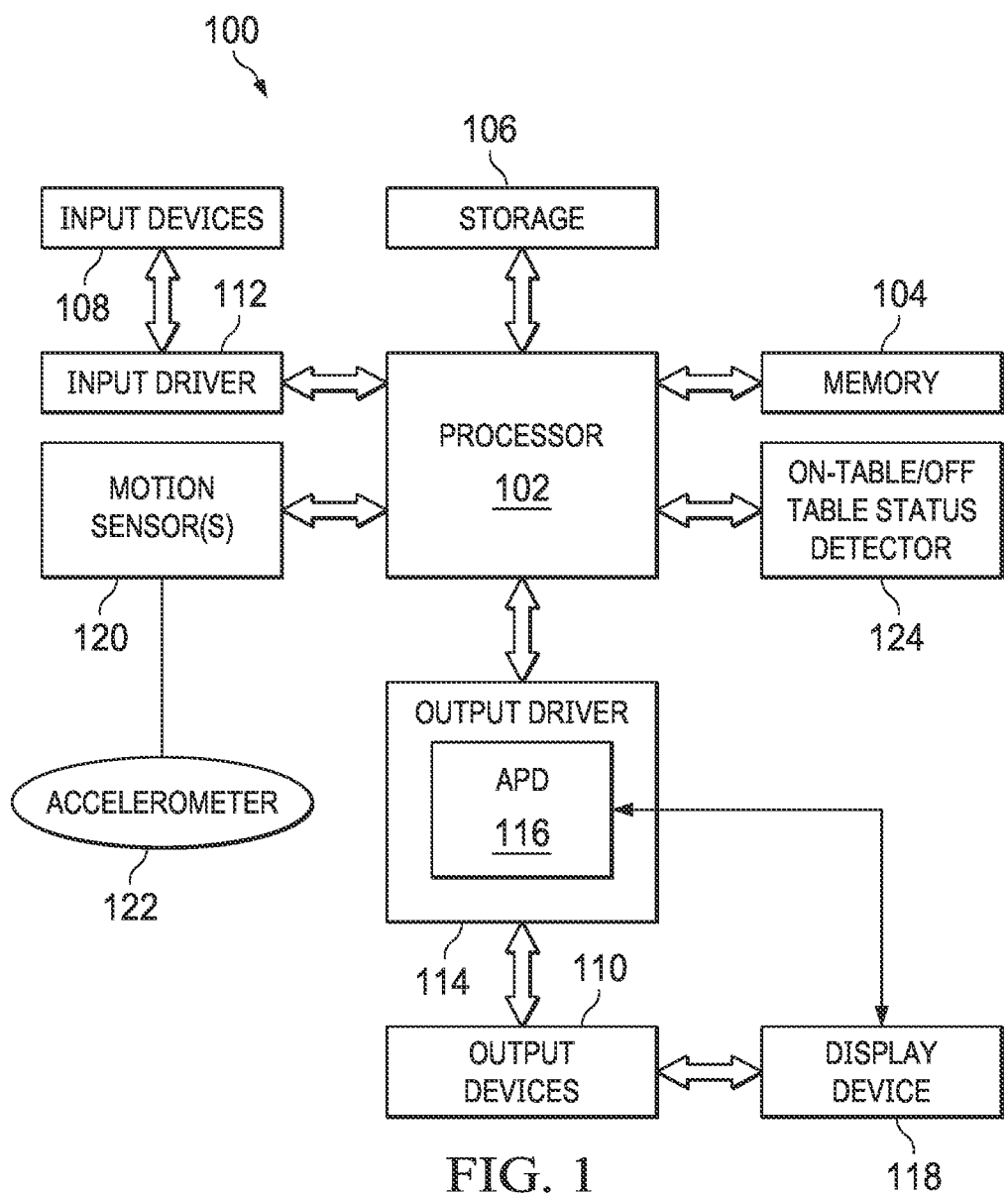
FIG. 1 is a block diagram of an example portable electronic device in accordance with some implementations.

Motion sensors are typically implemented by a portable electronic device to, for example, measure motion states, locations, orientations, and the like of the portable electronic device. One application for motion sensors includes determining whether the portable electronic device is in an "on-table state" or "an off-table state". The term "on-table state" as used herein is defined as a state in which the portable electronic device is located on a fixed substrate. The term "off-table state" as used herein is defined as a state in which the portable electronic device is located on a dynamic substrate. A fixed substrate refers to a substrate, such as a table or similar surface, that experiences minimal movements or vibrations compared to a dynamic substrate. A dynamic substrate refers to a substrate, such as a user's lap or hand, that experiences increased movements or vibrations compared to a fixed substrate. Depending on whether the portable electronic device is on a fixed or dynamic substrate, one or more configurations of the device can be changed, one or more operations can be performed, and the like. For example, when a portable electronic device is located on a fixed substrate, the heat emitted by the device is not as much of a concern to a user as when the device is located on a dynamic substrate. As such, if the portable electronic device is determined to be in an on-table state, the processor(s) is can be allowed to run at full throttle. However, if the portable electronic device is determined to be in an off-table state, throttling can be performed so that the processor(s) generates less heat and consumes less power. In another example, image stabilization can be enabled or the sensitivity of the keyboard/touchscreen can be adjusted when a determination is made that the portable electronic device is off-table to compensate for increased movements or vibrations experienced by the device.

In at least some configurations, portable electronic devices implement multiple motion sensors to determine whether the device is on-table or off-table. For example, an inertial measurement unit (IMU) integrating both a gyroscope and an accelerometer is typically used to determine whether the device is on-table or off-table by fusing the accelerometer and gyroscope sensor data. However, not all portable electronic devices may include both a gyroscope and an accelerometer. Also, implementing multiple sensors may present a number of challenges, such as increased complexity, size, cost, power consumption, or the like of a portable electronic device.

Accordingly, the present disclosure describes implementations of systems and methods for determining when the portable electronic device is in an on-table or an off-table state using a single motion sensor, such as a single accelerometer. By using a single motion sensor, multiple motion sensors are not required for performing on-table/off-table determinations, which reduces the complexity, size, cost, and power consumption of the portable electronic device. Also, the techniques described herein allow portable electronic devices that implement a single motion sensor, such as an accelerometer, to perform on-table/off-table determinations for the device.

As described in greater detail below, a portable electronic device implements a motion/inertial sensor and an on-table/off-table detection mechanism (herein referred to as "detection mechanism" for brevity). In at least some implementations, the motion sensor is an accelerometer capable of providing multi-axis acceleration data/measurements with respect to the portable electronic device. The raw acceleration data generated by the accelerator is sampled by the detection mechanism across one or more of the accelerometer axes. The detection mechanism, in at least some implementations, attenuates noise in the raw acceleration data obtained from the accelerometer using one or more filters to generate filtered acceleration data.

In at least some implementations, the detection mechanism determines the on-table/off-table status of the portable electronic device independent of the device's orientation, such as clamshell mode, tent mode, stand mode, tablet mode, and the like. In these implementations, the detection mechanism determines the absolute variation of the acceleration measurements in the filtered acceleration data to generate device orientation-independent acceleration data. For example, the detection mechanism, for each measured axis, finds the difference between a current vibration measurement (e.g., at sample $T_n$) and the previous vibration measurement (e.g., at sample $T_{n-1}$) in the filtered acceleration data. The detection mechanism then squares the differences, sums the squared differences, and takes the square root of the sum to obtain orientation-independent acceleration data for the current sample, e.g., $T_n$.

The detection mechanism compares each sampled acceleration measurement in the orientation-independent acceleration data to an acceleration threshold to determine if the acceleration measurement indicates that the portable electronic device is in an on-lap state or an off-lap state. For example, when the portable electronic device is in an on-table state, acceleration vibrations measured by the accelerometer will typically be weaker or less intense than when the portable electronic device is in an off-table state. Therefore, in at least some implementations, the acceleration threshold value is configured such that acceleration measurements satisfying the acceleration threshold value indicate that the portable electronic device is in an on-table state and absolute variations not satisfying the acceleration threshold value indicate that the portable electronic device is in an off-table state, or vice versa.

When the detection mechanism determines that an acceleration measurement in the orientation-independent acceleration data corresponds to an on-table acceleration vibration, the detection mechanism increases an on-table count. When the detection mechanism determines that an acceleration measurement in the orientation-independent acceleration data corresponds to an off-table acceleration vibration, the detection mechanism increases an off-table count. However, in some instances, user interactions with the portable electronic device can also cause vibrations that are detected and recorded by the accelerometer as acceleration vibrations. For example, a user typing on the keyboard, interacting with a trackpad, tapping or dragging a finger on the screen, moving the device, and the like can cause vibrations that may skew the on-table or off-table count, potentially resulting in an inaccurate final state determination. As such, in at least some implementations, before the detection mechanism increments the off-table count, the detection mechanism determines if the acceleration measurement indicates that a false off-table acceleration vibration or a true off-table acceleration vibration was recorded. For example, the determination mechanism implements a tap detector to detect when measured vibrations are a result of a user's interaction (or some other event) instead of off-table related acceleration vibrations. If the acceleration measurement is related to a false off-table acceleration vibration, the detection mechanism does not increment the off-table count.

The detection mechanism continues to increment each of the on-table and off-table counts until one of the counts reaches a specified count limit. If the portable electronic device is in an on-table state, the on-table count will typically reach the count limit before the off-table count. If the device is in an off-table state, the off-table count will typically reach the count limit before the on-table count. Therefore, in at least some implementations, the detection mechanism determines the final state (i.e., on-table or off-table) of the portable electronic device based on the count that reaches the count limit first. Once the final on-table/off-table state of the current window has been determined, the detection mechanism resets the on-table and off-table counts for the next sampling window. In at least some implementations, determining that the portable electronic device is in an on-table or off-table state triggers a component(s) of the device to perform (or refrain from performing) one or more actions, such as throttling the processor, adjusting the processor to full power, enabling image stabilization, disabling or enabling a microphone, and the like.

FIG. 1 illustrates a block diagram of an example portable electronic device 100 (also referred to herein as "device 100" for brevity) in which the on-table/off-table detection techniques described herein can be implemented. It should be understood that the techniques described herein are not limited to the device 100 shown in FIG. 1, and any portable electronic device implementing at least one motion sensor is capable of implementing the described techniques. In at least some implementations, the device 100 includes, for example, a laptop/notebook, a mobile device, a handheld gaming device, a tablet computing device, a wearable computing device, an audio headset, a remote control, or another type of portable electronic device. The device 100, in at least some implementations, comprises a processor 102, memory 104, storage 106, one or more input devices 108, and one or more output devices 110. The device 100, in at least some implementations, also comprises one or more of an input driver 112 or an output driver 114. In some implementations, the device 100 includes one or more software, hardware, circuitry, and firmware components in addition to or different from those shown in FIG. 1.

In at least some implementations, the processor 102 comprises a central processing unit (CPU), an accelerator processor (e.g., a graphics processing unit (GPU)), a CPU and an accelerator processor located on the same die or multiple dies (e.g., using a multi-chip-module (MCM)), or one or more processor cores, wherein each processor core is a CPU or an accelerator processor. The memory 104, in at least some implementations, is located on the same die as the processor 102 or is located separately from the processor 102. The memory 104 includes a volatile or non-volatile memory, such as random-access memory (RAM), dynamic RAM, cache, and so on.

The storage 106, in at least some implementations, comprises a fixed or removable storage, such as a hard disk drive, a solid-state drive, an optical disk, a flash drive, and so on. In at least some implementations, the input devices 108 comprise, for example, one or more of a keyboard, a keypad, a touch screen, a touchpad, a detector, a microphone, an accelerometer, a gyroscope, a biometric scanner, a network connection (e.g., a wireless local area network card for transmission/reception of wireless signals), and so on. The output devices 110, in at least some implementations, comprise, for example, one or more of a display, a speaker, a printer, a haptic feedback device, one or more lights, an antenna, or a network connection (e.g., a wireless local area network card for transmission/reception of wireless signals), and so on.

In at least some implementations, the input driver 112 communicates with the processor 102 and the input devices 108 and allows the processor 102 to receive input from the input devices 108. The output driver 114, in at least some implementations, communicates with the processor 102 and the output devices 110 and allows the processor 102 to send output to the output devices 110. It is noted that the device 100 operates in the same manner if the input driver 112 and the output driver 114 are not present. The output driver 114, in at least some implementations, includes an accelerated processing device (APD) 116 that is coupled to a display device 118. The APD 116 accepts compute commands and graphics rendering commands from processor 102, processes those compute and graphics rendering commands, and provides pixel output to display device 118 for display. The APD 116, in at least some implementations, includes one or more parallel processing units that perform computations in accordance with a single-instruction-multiple-data (SIMD) paradigm. Thus, although various functionality is described herein as being performed by or in conjunction with the APD 116, in other implementations, the functionality described as being performed by the APD 119 is additionally or alternatively performed by other computing devices having similar capabilities that are not driven by a host processor (e.g., processor 102). For example, in at least some implementations, any processing system that performs processing tasks in accordance with a SIMD paradigm performs the functionality described herein. Alternatively, in at least some implementations, computing systems that do not perform processing tasks in accordance with a SIMD paradigm perform the functionality described herein.

The device 100 further includes one or more motion sensors 120 configured to measure or detect motion of the device 100. In at least some implementations, at least one of the motion sensors 120 is an inertial sensor, such as an accelerometer 122, that measures linear acceleration of the device 100. The accelerometer 122, in at least some implementations, is capable of providing single or multi-axis acceleration measurements with respect to the device 100. The accelerometer 122 measures linear acceleration by, for example, detecting and measuring mechanical vibrations (also referred to herein as acceleration vibrations) along one or more dimensions or axes (e.g., an X-axis, a Y-axis, and a Z-axis) relative to an origin point of a coordinate system based on the body of the device 100. One example of a coordinate system is a Cartesian coordinate system, but other non-Cartesian coordinate systems are applicable as well.

Figure 2:
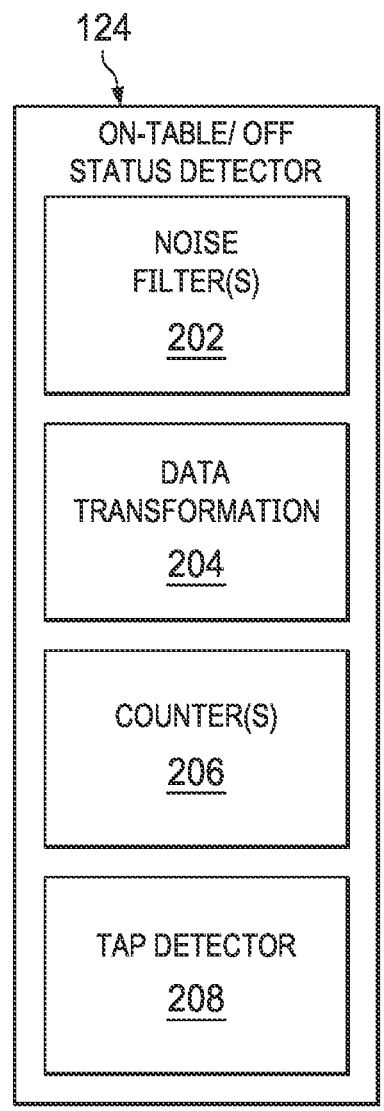
FIG. 2 is a block diagram of an on-table/off-table status detector implemented by the portable electronic device of FIG. 1 in accordance with some implementations.

The device 100 also includes an on-table/off-table status detector 124 (also referred to herein as "status detector 124" for brevity) for determining if the device 100 is located on a fixed substrate or a dynamic substrate so that the device 100 can be configured accordingly. A fixed substrate refers to a substrate, such as a table or similar surface, that experiences minimal movements or vibrations compared to a dynamic substrate. A dynamic substrate refers to a substrate, such as a user's lap or hand, that experiences increased movements or vibrations compared to a fixed substrate. When the device 100 is located on a fixed surface, the device 100 is considered "on-table" or has an "on-table" state. When the device 100 is located on a dynamic surface, the device is considered "off-table" or has an "off-table" state. As shown in FIG. 2, the status detector 124 includes one or more filters 202, a data transformation component 204, one or more counters 206, and a tap detector 208. The status detector 124 and each of these components, in at least some implementations, are implemented as hardware, circuitry, firmware, software, or any combination thereof. For example, the status detector 124, in at least some implementations, is implemented separate from or as part of one or more processors 102 (e.g., CPU, GPU, a combination thereof, or the like), one or more application-specific integrated circuits/circuitry (ASICs), one or more programmable logic devices, or a combination thereof. In other implementations, the status detector 124 is implemented as software executable on one or more processors 102. Also, although FIG. 1 shows the status detector 124 as being separate from the processor 102, the status detector 124, in at least some implementations, is part of the processor 102 or another component(s) of the device 100.

Figure 3:
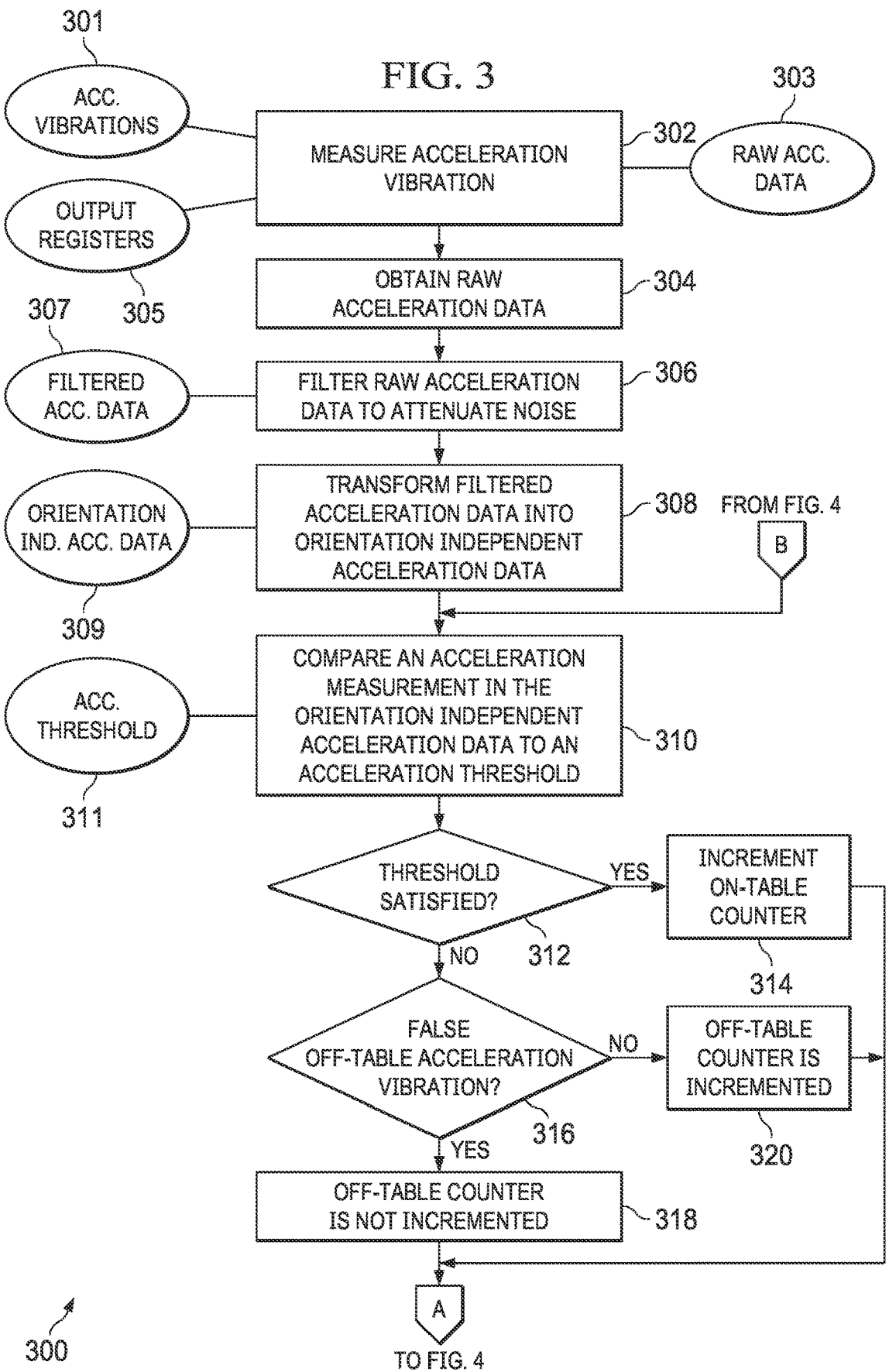
FIG. 3 and FIG. 4 together are a flow diagram illustrating an example method for detecting when a portable electronic device is in an on-table state or an off-table state in accordance with some implementations.
Figure 4:
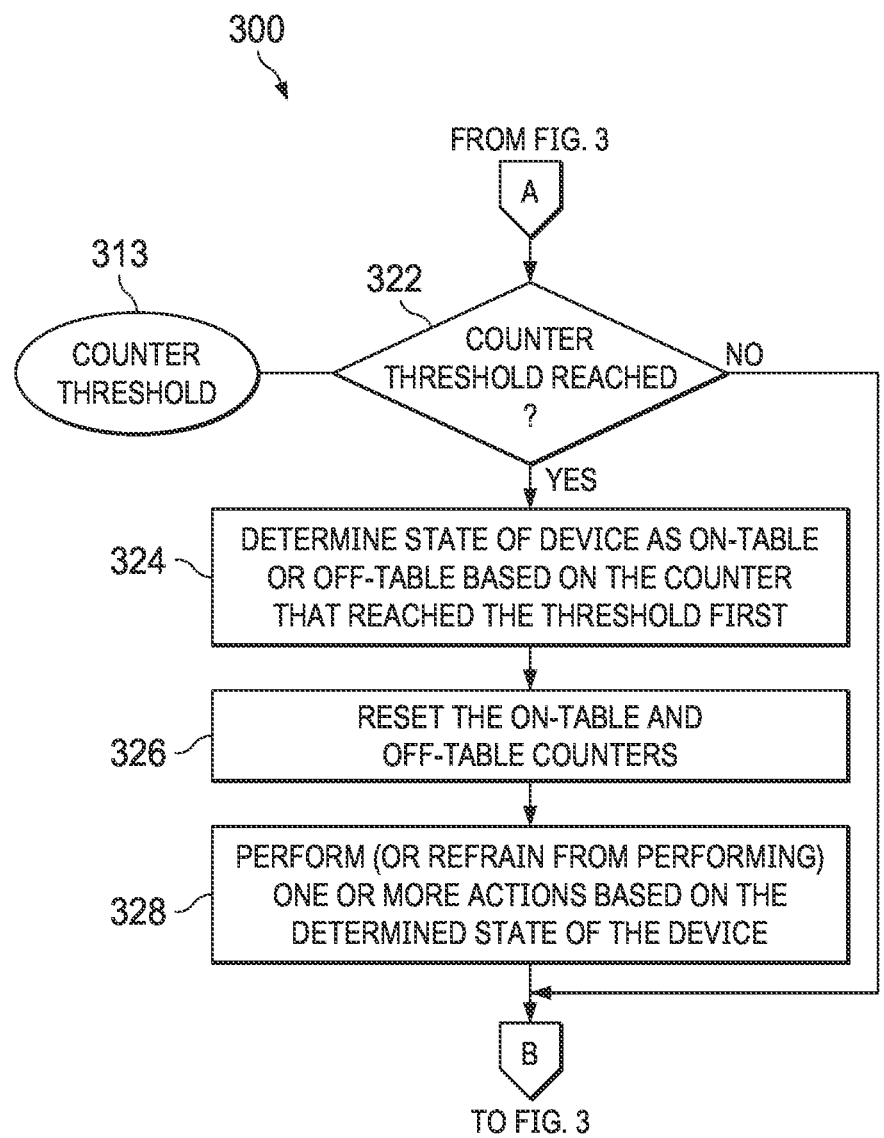

FIG. 3 and FIG. 4 together illustrate a flow diagram of a method 300 for determining if the device 100 is in an on-table state or an off-table state. For purposes of description, the method 300 is described with respect to an example implementation at the device 100 of FIG. 1, but it will be appreciated that, in other implementations, the method 300 is implemented at portable electronic devices having different configurations. Also, the method 300 is not limited to the sequence of operations shown in FIG. 3, as at least some of the operations can be performed in parallel or in a different sequence. Moreover, in at least some implementations, the method 300 can include one or more different operations than those shown in FIG. 3.

At block 302, the device 100 is in an on-table state or an off-table state and a single motion sensor 120, such as an accelerometer 122, detects and measures acceleration vibrations 301 along one or more axes (e.g., an X-axis, a Y-axis, and a Z-axis). The measured acceleration vibrations 301, in at least some implementations, are stored as raw acceleration data 303 in output registers 305 (or another storage/holding component of the device 100) associated with the motion sensor 120. In at least some implementations, the raw acceleration data 303 includes a value representing measured acceleration force (e.g., acceleration due to gravity g or milli-g, meters per second squared (m/s$^2$), or the like) for each detected acceleration vibration 301 along one or more axes of the motion sensor 120. The raw acceleration data 303, in at least some implementations, also includes a time or frequency value associated with each measured acceleration vibration 301.

At block 304, the status detector 124 obtains (e.g., samples) the raw acceleration data 303 generated by the motion sensor 120. For example, in at least some implementations, the status detector 124 receives one or more signals representing the raw acceleration data 303 from the motion sensor 120. In other implementations, the status detector 124 obtains the raw acceleration data 303 directly from, for example, the output registers 305 (or other data storage/holding components) associated with the motion sensor 120. In some instances, the raw acceleration data 303 includes noise, which is any data or signal within the raw acceleration data 303 that does not represent actual acceleration data. As such, the status detector 124, at block 306, passes the raw acceleration data 303 to one or more filters 202. The filter 202 attenuates the noise in the raw acceleration data 303 and outputs filtered acceleration data 307.

FIG. 5 shows a graph 500 of example raw (unfiltered) acceleration data 303 that is input into the filter 202 and the filtered acceleration data 307 output by the filter 202. Each sample of raw acceleration data 303 and filtered acceleration data 307 shown in FIG. 5 is represented as the sum of the absolute values of the acceleration measurements taken for each of the axes of the motion sensor 120. However, other methods for representing the raw acceleration data 303 and the filtered acceleration data 307 are applicable as well. The Y-axis of the graph 500 represents absolute computer values, which is a representation of milli-g with a multiplication factor (e.g., 4096 LSB is equivalent to 1000 milli-g or 1G). The X-axis of the graph 500 represents sample counts of the raw acceleration data 303 and the filtered acceleration data 307

The filter 202 can include any filter applicable for attenuating noise in accelerometer data. One example of a filter 202 is a fixed-point infinite impulse response (IIR) filter. Fixed-point IIR filters are advantageous over other types of filters because they are low-latency, provide real-time control, and require less co-efficient and memory compared to other types of filters. If the filter 202 is implemented using a fixed-point IIR filter, the filter 202 takes as input the raw acceleration data 303 and outputs the filtered acceleration data 307 according to the following equation:

$$y[n] = (x[n] \times K1) + (y[n-1] \times K2), \quad (EQ\ 1)$$

where y[n] is the current output sample of filtered acceleration data 307, x[n] is the current input sample of the raw acceleration data 303, y[n−1] is the previous output sample of the filtered acceleration data 307, and K1 and K2 are gain values. In many instances, different device types (e.g., laptop, cellular phone, etc.), different models of the same device type, or different configurations of the same model of a device type, have a different placements of the motion sensor 120 and different sources and levels of noise. Therefore, in at least some implementations, the filter 202 parameters, such as K1 and K2, coefficients, and the like, are tuned or selected based on one or more of the type of the device 100, the model of the device 100, the configuration of the device 100, or the like.

Referring to FIG. 3, at block 308, the data transformation component 204 of the status detector 124 transforms the filtered acceleration data 307 into orientation-independent acceleration data 309. For example, in at least some implementations, the device 100 is capable of being configured in multiple different orientation, such as clamshell orientation, a tent orientation, a stand orientation, a tablet orientation, and the like. Therefore, depending on the orientation of the device 100, the motion sensor 120 may pick up vibrations along one or more of the axes of the motion sensor 120. The data transformation component 204 overcomes this potential issue by determining the absolute variation of the acceleration/vibration measurements in the filtered acceleration data 307 to generate orientation-independent acceleration data 309. For example, the data transformation component 204, for each measured axis, finds the difference between a current acceleration measurement (e.g., at sample $T_n$) and the immediately previous acceleration measurement (e.g., at sample $T_{n-1}$) in the filtered acceleration data 307. The data transformation component 204 then squares the differences, sums the squared differences, and takes the square root of the sum to obtain orientation-independent acceleration data 309 for the current sample, e.g., $T_n$. The orientation-independent acceleration data 309 includes the absolute variation (also referred to herein as "orientation-independent acceleration measurement") determined for the current sample. The data transformation component 204 performs this process for all samples in the filtered acceleration data 307. FIG. 6 shows a graph 600 of one example of the orientation-independent acceleration data 309 generated by the data transformation component 204. As shown in FIG. 6, the orientation-independent acceleration data 309 more clearly identifies acceleration measurements 602 indicating an on-table status and acceleration measurements 504 indicating an off-table status than the original raw acceleration data 303 shown in FIG. 5.

Referring to FIG. 3, at block 310, the status detector 124 compares an acceleration measurement in the orientation-independent acceleration data 309 to an acceleration threshold 311 (e.g., a counter threshold value), to determine if the acceleration measurement indicates that the device 100 is in an on-lap state or an off-lap state. For example, when the device 100 is in an on-table state, acceleration vibrations measured by the motion sensor 120 will typically be weaker or less intense than when the device 100 is in an off-table state. Therefore, in at least some implementations, the acceleration threshold 311 is configured such that acceleration measurements from the orientation-independent acceleration data 309 satisfying the acceleration threshold 311 indicate that the device 100 is in an on-table state and acceleration measurements from the orientation-independent acceleration data 309 not satisfying the acceleration threshold 311 indicate that the device 100 is in an off-table state, or vice versa. Similar to the filter 202, the acceleration threshold 311, in at least some implementations is configured based on one or more of the type of the device 100, the model of the device 100, or the configuration of the device 100.

In at least some implementations, satisfying a threshold value refers to having a value that is less than the threshold value, whereas not satisfying a threshold value refers to having a value that is greater than the threshold value. In other implementations, satisfying a threshold value refers to having a value that is greater than the threshold value, whereas not satisfying a threshold value refers to having a value that is less than the threshold value. Also, in at least some implementations, one of satisfying a threshold value or not satisfying a threshold value additionally refers to having a value that equals the threshold value. For purposes of illustration, the following description provides an example in which an acceleration measurement satisfies the acceleration threshold 311 when the acceleration measurement has a value that is less than or equal to the acceleration threshold 311 and does not satisfy the acceleration threshold 311 when the acceleration measurement has a value that is greater than or equal to the acceleration threshold 311. However, it is to be understood that other threshold configurations are applicable as well.

At block 312, the status detector 124 determines if the value of the current acceleration measurement being considered satisfies the acceleration threshold 311 (e.g., 1 milli-g). At block 314, if the value of the current acceleration measurement satisfies (e.g., is less than or equal to 1 milli-g) the acceleration threshold 311, the status detector 124 determines that the acceleration measurement indicates that the device 100 is in an on-table state and increments an on-table counter 206-1. The method 300 then continues to block 322 (FIG. 4). At block 316, if the value of the current acceleration measurement does not satisfy (e.g., is greater than 1 milli-g) the acceleration threshold 311, the tap detector 208 of the status detector 124 determines if the current acceleration measurement results from a false off-table acceleration vibration. For example, user interactions with the device 100 can also cause vibrations that are detected and recorded by the motion sensor 120 as acceleration vibrations. A user typing on the keyboard, interacting with a trackpad, tapping or dragging a finger on the screen, moving the device, and the like can cause vibrations that may skew the on-table or off-table count, potentially resulting in an inaccurate final state determination. As such, in at least some implementations, the tap detector 208 detects when measured vibrations are a result of a user's interaction (or some other event) instead of off-table related acceleration vibrations.

The tap detector 208 is configured to implement one or more techniques for detecting false acceleration vibrations resulting from user interactions. For example, a signal pulse generated by the accelerometer in response to a user interaction, such as a tap, typically has a narrower width than acceleration vibrations indicating that the portable electronic device is in an off-table state. Therefore, in at least some implementations, the tap detector 208 compares the width of a signal pulse generated by the accelerometer and certain threshold value. If the width of the signal pulse is less than the given sample count and above the threshold value, the tap detector 208 determines that the acceleration vibration/measurement is associated with a user interaction and the determination mechanism does not increment the off-table count. In another example, the number of continuous samples having an acceleration measurement above the acceleration threshold 311 is typically less when the samples are associated with a user interaction in an on-table state compared to acceleration vibrations in an off-table state. Therefore, in at least some implementations, the tap detector 208 compares the number of continuous samples having acceleration measurements above the acceleration threshold 311 to identify false acceleration vibrations resulting from user interactions.

At block 318, if the tap detector 208 determines that the acceleration measurement being considered from the orientation-independent acceleration data 309 is a false acceleration vibration, the status detector 124 does not increment the off-table counter 206-2. The method 300 then continues to block 322. At block 320, if the tap detector 208 determines that the acceleration measurement being considered from the orientation-independent acceleration data 309 is not a false acceleration vibration, the status detector 124 increments the off-table counter 206-2. At block 322, the status detector 124 determines if either of the on-table counter 206-1 or the off-table counter 206-2 has reached a counter threshold 313 (e.g., a counter threshold value). If neither of the on-table counter 206-1 or the off-table counter 206-2 has reached the counter threshold 313, the method 300 returns to block 310, and the next acceleration measurement in the orientation-independent acceleration data 309 is compared to the acceleration threshold 311. At block 324, if either of the on-table counter 206-1 or the off-table counter 206-2 has reached the counter threshold 313, the status detector 124 determines that the device 100 is currently in the state (on-table or off-table) associated with the counter that reached the counter threshold 313 first. For example, if the on-table counter 206-1 reaches the counter threshold 313 before the off-table counter 216-2, the status detector 124 determines that the device 100 is in an on-table state. However, if off-table counter 216-2 reaches the counter threshold 313 before the on-table counter 216-1, the status detector 124 determines that the device 100 is in an off-table state. At block 326, the status detector 124 resets the on-table counter 216-1 and the off-table counter 216-2 for the next determination window and the method 300 returns to block 304. In at least some implementations, the method 300 returns to block 310 to process the next acceleration measurement in the orientation-independent acceleration data 309. In other implementations the method 300 continues to block 328.

At block 328, the processor 102 or one or more other components of the device 100 performs (or refrains from performing) one or more operations in response to the status detector 124 determining that the device 100 is in an on-table state or an off-table state. Stated differently, in at least some implementations, the determination that the device 100 is in an on-table state or an off-table state acts as a trigger for one or more components of the device 100 to take one or more actions. For example, when the device 100 is determined to be in an on-table state, the processor(s) 102 is allowed to run at full throttle. Stated differently, the clock speed of the processor 102 is maintained or increased. However, if the device 100 is determined to be in an off-table state, throttling can be performed so that the processor(s) 102 generates less heat and consumes less power. Stated differently, the clock speed of the processor 102 is decreased. In another example, image stabilization can be enabled or the sensitivity of the keyboard/touchscreen can be adjusted when a determination is made that the device 100 is off-table to compensate for increased movements or vibrations experienced by the device. In a further example, if the device 100 is pair of headphones, media (e.g., audio, video, games) can be paused or started or a microphone can be enabled or disabled depending on if the device 100 is in an on-table state or an off-table state. The method 300 then returns to block 310 to process the next acceleration measurement in the orientation-independent acceleration data 309.

In some implementations, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:
1. A method comprising:
responsive to an acceleration measurement from a motion sensor of a portable electronic device satisfying an acceleration threshold, incrementing a first count;

responsive to the acceleration measurement failing to satisfy the acceleration threshold, selectively incrementing or refraining from incrementing a second count; and configuring one or more components of the portable electronic device based on the portable electronic device being in an off-table state or an on-table state as indicated by whichever of the first count or the second count reaches a count threshold first.

2. The method of claim 1, wherein configuring the one or more components of the portable electronic device comprises one of:

determining that the portable electronic device is in the on-table state responsive to the first count reaching the count threshold before the second count; or determining that the portable electronic device is in the off-table state responsive to the second count reaching the count threshold before the first count.

3. The method of claim 1, further comprising:

prior to determining whether the acceleration measurement satisfies the acceleration threshold, removing noise from acceleration data to generate filtered acceleration data, wherein the acceleration measurement is taken from the filtered acceleration data.

4. The method of claim 3, wherein removing noise from the acceleration data comprises inputting the acceleration measurement into a fixed-point infinite impulse response filter.

5. The method of claim 1, further comprising:

prior to determining whether the acceleration measurement satisfies the acceleration threshold, transforming acceleration data that includes the acceleration measurement into device orientation-independent acceleration data.

6. The method of claim 5, wherein transforming the acceleration data into device orientation-independent acceleration data comprises:

determining, for each acceleration measurement in the acceleration data and for each measured axis of the motion sensor, an absolute variation between the acceleration measurement and an immediately previous acceleration measurement in the acceleration data; and summing the absolute variations to generate orientation-independent acceleration measurements in the device orientation-independent acceleration data.

7. The method of claim 1, wherein configuring the one or more components of the portable electronic device comprises:

one of increasing or maintaining a clock speed of a processor of the portable electronic device responsive to determining that the portable electronic device is located on a fixed substrate as indicated by the first count reaching the count threshold before the second count.

8. The method of claim 1, wherein configuring the one or more components of the portable electronic device comprises:

decreasing a clock speed of a processor of the portable electronic device responsive to determining that the portable electronic device is located on a dynamic substrate as indicated by the second count reaching the count threshold before the first count.

9. The method of claim 1, wherein selectively incrementing or refraining from incrementing the second count comprises:

responsive to the acceleration measurement failing to satisfy the acceleration threshold, determining whether the acceleration measurement indicates a false acceleration vibration;

responsive to the acceleration measurement indicating a false acceleration vibration, refraining from incrementing the second count; and responsive to the acceleration measurement indicating a true acceleration vibration, incrementing the second count.

10. A portable electronic device comprising:

a status detector configured to:

responsive to an acceleration measurement from a motion sensor of the portable electronic device satisfying an acceleration threshold, increment a first count; and responsive to the acceleration measurement failing to satisfy the acceleration threshold, selectively increment or refraining from incrementing a second count; and a processor configured to:

configure one or more components of the portable electronic device based on whether the portable electronic device is in an on-table state or an off-table state as indicated by whichever of the first count or the second count reaches a count threshold first.

11. The portable electronic device of claim 10, wherein the status detector is configured to determine that the portable electronic device is in the on-table state responsive to the first count reaching the count threshold before the second count, and wherein the status detector is configured to determine that the portable electronic device is in the off-table state responsive to the second count reaching the count threshold before the first count.

12. The portable electronic device of claim 11, wherein the status detector is further configured to:

prior to determining whether the acceleration measurement satisfies the acceleration threshold, removing noise from acceleration data to generate filtered acceleration data, wherein the acceleration measurement is taken from the filtered acceleration data.

13. The portable electronic device of claim 12, wherein the status detector is configured to remove noise from the acceleration data by inputting the acceleration measurement into a fixed-point infinite impulse response filter.

14. The portable electronic device of claim 11, wherein the status detector is further configured to:

prior to determining whether the acceleration measurement satisfies the acceleration threshold, transforming acceleration data that includes the acceleration measurement into device orientation-independent acceleration data.

15. The portable electronic device of claim 14, wherein the status detector is configured to transform the acceleration data into device orientation-independent acceleration data by:

determining, for each acceleration measurement in the acceleration data and for each measured axis of the motion sensor, an absolute variation between the acceleration measurement and an immediately previous acceleration measurement in the acceleration data; and summing the absolute variations to generate orientation-independent acceleration measurements in the device orientation-independent acceleration data.

16. The portable electronic device of claim 10, wherein the processor is configured to configure the one or more components of the portable electronic device by:

one of increasing or maintaining a clock speed of the processor responsive to determining that the portable electronic device is located on a fixed substrate as indicated by the first count reaching the count threshold before the second count.

17. The portable electronic device of claim 10, wherein the processor is configured to configured the one or more components of the portable electronic device by:

decreasing a clock speed of the processor responsive to determining that the portable electronic device is located on a dynamic substrate as indicated by the second count reaching the count threshold before the first count.

18. A portable electronic device comprising:

a status detector configured to:

responsive to an acceleration measurement from a motion sensor of the portable electronic device satisfying an acceleration threshold, increment a first count; and responsive to the acceleration measurement failing to satisfy the acceleration threshold, selectively increment or refrain from incrementing a second count responsive to whether the acceleration measurement indicates a false acceleration vibration; and a processor configured to:

configure one or more components of the portable electronic device based whether the portable electronic device is in an on-table state or an off-table state as indicated by whichever of the first count or the second count reaches a count threshold first.

19. The portable electronic device of claim 18, wherein the status detector is configured to determine that the portable electronic device is in the on-table state responsive to the first count reaching the count threshold before the second count, and wherein the status detector is configured to determine that the portable electronic device is in the off-table state responsive to the second count reaching the count threshold before the first count.

20. The portable electronic device of claim 18, further comprising:

a filter configured to remove noise from acceleration data to generate filtered acceleration data prior to the status detector determining whether the acceleration measurement satisfies the acceleration threshold; and a data transformation component configured to transform the acceleration data into device orientation-independent acceleration data, wherein the acceleration measurement is taken from the device orientation-independent acceleration data.

* * * * *